(12) United States Patent
Hanahara et al.

(10) Patent No.: US 11,906,077 B2
(45) Date of Patent: Feb. 20, 2024

(54) FILLER PIPE AND METHOD FOR MANUFACTURING FILLER PIPE

(71) Applicant: Yachiyo Industry Co., Ltd., Sayama (JP)

(72) Inventors: Hiroshi Hanahara, Tochigi (JP); Takeshi Hirohara, Tochigi (JP); Tadashi Koyama, Tochigi (JP)

(73) Assignee: YACHIYO INDUSTRY CO., LTD., Sayama (JP)

( * ) Notice: Subject to any disclaimer, the term of this patent is extended or adjusted under 35 U.S.C. 154(b) by 0 days.

(21) Appl. No.: 18/044,651

(22) PCT Filed: Aug. 25, 2021

(86) PCT No.: PCT/JP2021/031117
§ 371 (c)(1),
(2) Date: Mar. 9, 2023

(87) PCT Pub. No.: WO2022/054575
PCT Pub. Date: Mar. 17, 2022

(65) Prior Publication Data
US 2023/0392721 A1   Dec. 7, 2023

(30) Foreign Application Priority Data

Sep. 11, 2020   (JP) ................... 2020-152959

(51) Int. Cl.
*F16L 11/11*   (2006.01)
*B29C 48/21*   (2019.01)
(Continued)

(52) U.S. Cl.
CPC ........... *F16L 11/11* (2013.01); *B29C 48/0018* (2019.02); *B29C 48/21* (2019.02);
(Continued)

(58) Field of Classification Search
CPC ...... F16L 11/11; F16L 2011/047; F16L 9/121; F16L 9/123
(Continued)

(56) References Cited

U.S. PATENT DOCUMENTS 5,284,184 A * 2/1994 Noone .................... F16L 11/04
138/104
5,469,892 A * 11/1995 Noone .................. B29C 48/335
138/121
(Continued)

FOREIGN PATENT DOCUMENTS

JP   H03-117794 A   5/1991
JP   2007-046772 A   2/2007
(Continued)

OTHER PUBLICATIONS

International Preliminary Report on Patentability, International Application No. PCT/JP2021/031117, English translation included, 16 pages.
(Continued)

*Primary Examiner* — Patrick F Brinson
(74) *Attorney, Agent, or Firm* — Rankin, Hill & Clark LLP

(57) ABSTRACT

A filler pipe for suppressing swelling deformation caused by fuel, and a manufacturing method thereof. A resin filler pipe has a bellows section, including peaks and valleys, and an ordinary section, not including the bellows section, and is provided with at least inner layers, barrier layers, and outer layers. In the ordinary section, the inner layer is thinner than the outer layer, and the rate of increase in the proportion of the inner layer in the peaks of the bellows section with respect to the proportion of the inner layer in the ordinary section is equal to or less than the rate of increase in the proportion of the outer layer in the peaks of the bellows
(Continued)

section with respect to the proportion of the outer layer in the ordinary section.

2 Claims, 5 Drawing Sheets

(51) Int. Cl.
| | |
|---|---|
| *B29C 48/00* | (2019.01) |
| *B29C 53/30* | (2006.01) |
| *B29D 23/00* | (2006.01) |
| *B32B 1/08* | (2006.01) |
| *B32B 27/08* | (2006.01) |
| *B32B 27/32* | (2006.01) |
| *B60K 15/04* | (2006.01) |
| *B29K 23/00* | (2006.01) |
| *B29L 23/00* | (2006.01) |
| *F16L 11/04* | (2006.01) |

(52) U.S. Cl.
CPC ............ *B29C 53/30* (2013.01); *B29D 23/00* (2013.01); *B32B 1/08* (2013.01); *B32B 27/08* (2013.01); *B32B 27/32* (2013.01); *B60K 15/04* (2013.01); *B29K 2023/065* (2013.01); *B29K 2023/086* (2013.01); *B29L 2023/00* (2013.01); *B32B 2250/03* (2013.01); *B32B 2250/242* (2013.01); *B32B 2307/7242* (2013.01); *B32B 2597/00* (2013.01); *F16L 2011/047* (2013.01)

(58) Field of Classification Search
USPC .................... 138/121, 122, 137, 140, 141
See application file for complete search history.

(56) References Cited

U.S. PATENT DOCUMENTS

| | | | | | |
|---|---|---|---|---|---|
| 5,588,468 | A | * | 12/1996 | Pfleger | F16L 11/11 138/121 |
| 5,850,855 | A | * | 12/1998 | Kerschbaumer | F16L 11/15 138/121 |
| 6,755,217 | B1 | * | 6/2004 | Yoshida | F16L 11/112 138/121 |
| 7,562,679 | B2 | * | 7/2009 | Yasuda | B60K 15/04 138/140 |
| 2004/0256018 | A1 | * | 12/2004 | Ikemoto | B29D 23/001 138/121 |
| 2007/0012374 | A1 | | 1/2007 | Yasuda et al. | |
| 2008/0156389 | A1 | * | 7/2008 | Katayama | B29C 66/91421 264/171.27 |

FOREIGN PATENT DOCUMENTS

| | | |
|---|---|---|
| JP | 2007-292299 A | 11/2007 |
| JP | 2010-116094 A | 5/2010 |
| JP | 2017-065663 A | 4/2017 |
| JP | 2018-118498 A | 8/2018 |
| WO | 2012-115224 A1 | 7/2014 |

OTHER PUBLICATIONS

International Search Report, International Application No. PCT/JP2021/031117, dated Nov. 2, 2021, 2 pages.
International Preliminary Report on patentability, International Application No. PCT/JP2021/031117, 3 pages.
Written Opinion of the International Searching Authority dated Nov. 2, 2021 filed in PCT/JP2021/031117, 4 pages.

\* cited by examiner

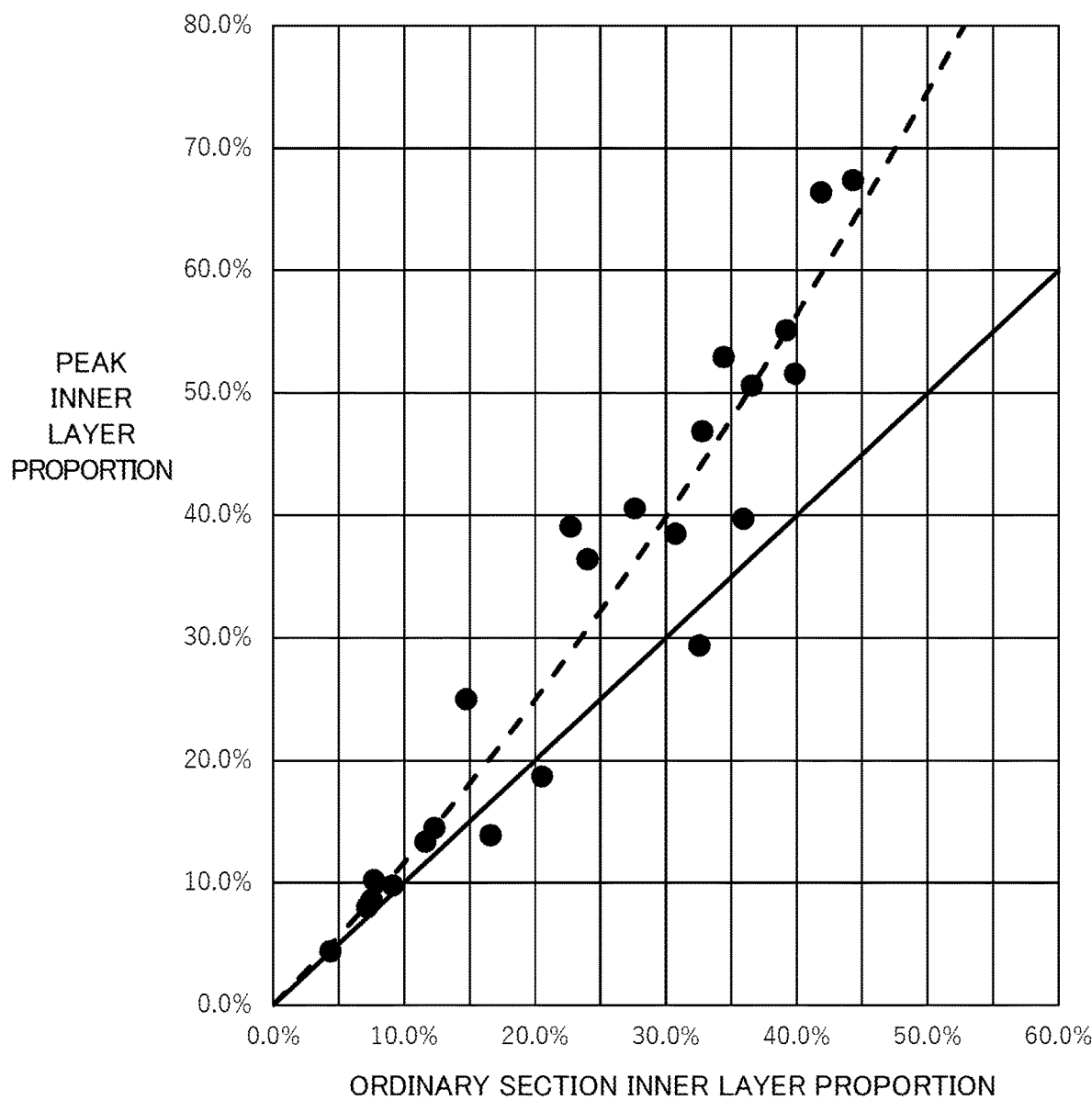

FILLER PIPE AND METHOD FOR MANUFACTURING FILLER PIPE

TECHNICAL FIELD

The present invention relates to a filler pipe and a method for manufacturing a filler pipe.

BACKGROUND ART

In recent years, a filler pipe used in an automobile or the like is made of resin to reduce the weight of a vehicle body. The filler pipe made of resin is configured to include a barrier layer with excellent gas barrier properties due to regulations on evaporative fuel gas discharged from vehicles. For example, ethylene vinyl alcohol (EVOH) copolymer can be given as a typical material with excellent gas barrier properties. EVOH has excellent gas barrier properties, but has low resistance to ethanol and the like contained in a fuel. Accordingly, the EVOH barrier layer is sandwiched between an inner layer and an outer layer made of resin to form a multilayer structure.

The filler pipe has a bellows section that is formed of peaks and valleys and an ordinary section that does not include the bellows section. The bellows section is a section that is bent when the filler pipe connects a fuel tank and a fuel filler to each other. In manufacturing of the filler pipe, the filler pipe having the bellows section and the ordinary section can be continuously manufactured by using a pipe manufacturing apparatus including a corrugating mechanism.

CITATION LIST

Patent Literature

Patent Literature 1: Japanese Patent Application Publication No. 2010-116094

SUMMARY OF INVENTION

Technical Problem

When the bellows section is formed in the pipe manufacturing apparatus, positions corresponding to the peaks of the bellows section are sucked to transfer a tubular material on a forming surface. In this case, in the valleys, the tubular material comes into contact with tips in a forming mold and is stretched, and the thickness tends to decrease. Meanwhile, in the peaks, the material gathers and the thickness tends to increase. Particularly, in the inner layer in each peak, the material is likely to gather toward the center of the peak, and the inner layer tends to have a larger thickness than the outer layer of the peak. When the inner layer in the peak has a relatively large thickness, there occurs a problem that the inner layer in the peak comes into contact with the fuel and swelling deformation is likely to occur.

Accordingly, an object of the present invention is to provide a filler pipe and a filler pipe manufacturing method that can suppress swelling deformation due to fuel.

A filler pipe according to the present invention to achieve the above problem is a filler pipe having a bellows section that includes a peak and a valley and an ordinary section that does not include the bellows section, the filler pipe made of resin and comprising at least: an inner layer; a barrier layer; and an outer layer. Here, in the ordinary section, the outer layer is thinner than the inner layer, and an increase rate of an inner layer proportion in the peak of the bellows section with respect to an inner layer proportion in the ordinary section is equal to or less than an increase rate of an outer layer proportion in the peak of the bellows section with respect to an outer layer proportion in the ordinary section.

A filler pipe manufacturing method according to the present invention is a filler pipe manufacturing method, including: an extrusion step of extruding a tubular material including at least an inner layer, a barrier layer, and an outer layer; and a forming step of forming a bellows section that includes a peak and a valley and an ordinary section that does not include the bellows section by transferring part of the tubular material to forming surfaces of a plurality of split forming molds while moving the plurality of split forming molds. Here, in the extrusion step, an inner layer of the tubular material is set to be thinner than the outer layer, and in the forming step, the outer layer of the bellows section is sucked to transfer the tubular material to the split forming molds, and setting is made such that an increase rate of an inner layer proportion in the peak with respect to an inner layer proportion in the ordinary section after the forming is equal to or less than an increase rate of an outer layer proportion in the peak with respect to an outer layer proportion in the ordinary section.

According to the present invention, making the inner layer in the peak of the bellows section thin can suppress swelling deformation due to fuel.

Advantageous Effects of Invention

The present invention can provide a filler pipe and a filler pipe manufacturing method that can suppress swelling deformation due to fuel.

BRIEF DESCRIPTION OF DRAWINGS

FIG. 5 is a graph showing relationships between an ordinary section inner layer proportion and a peak inner layer proportion in multiple filler pipes.

DESCRIPTION OF EMBODIMENTS

Figure 1:
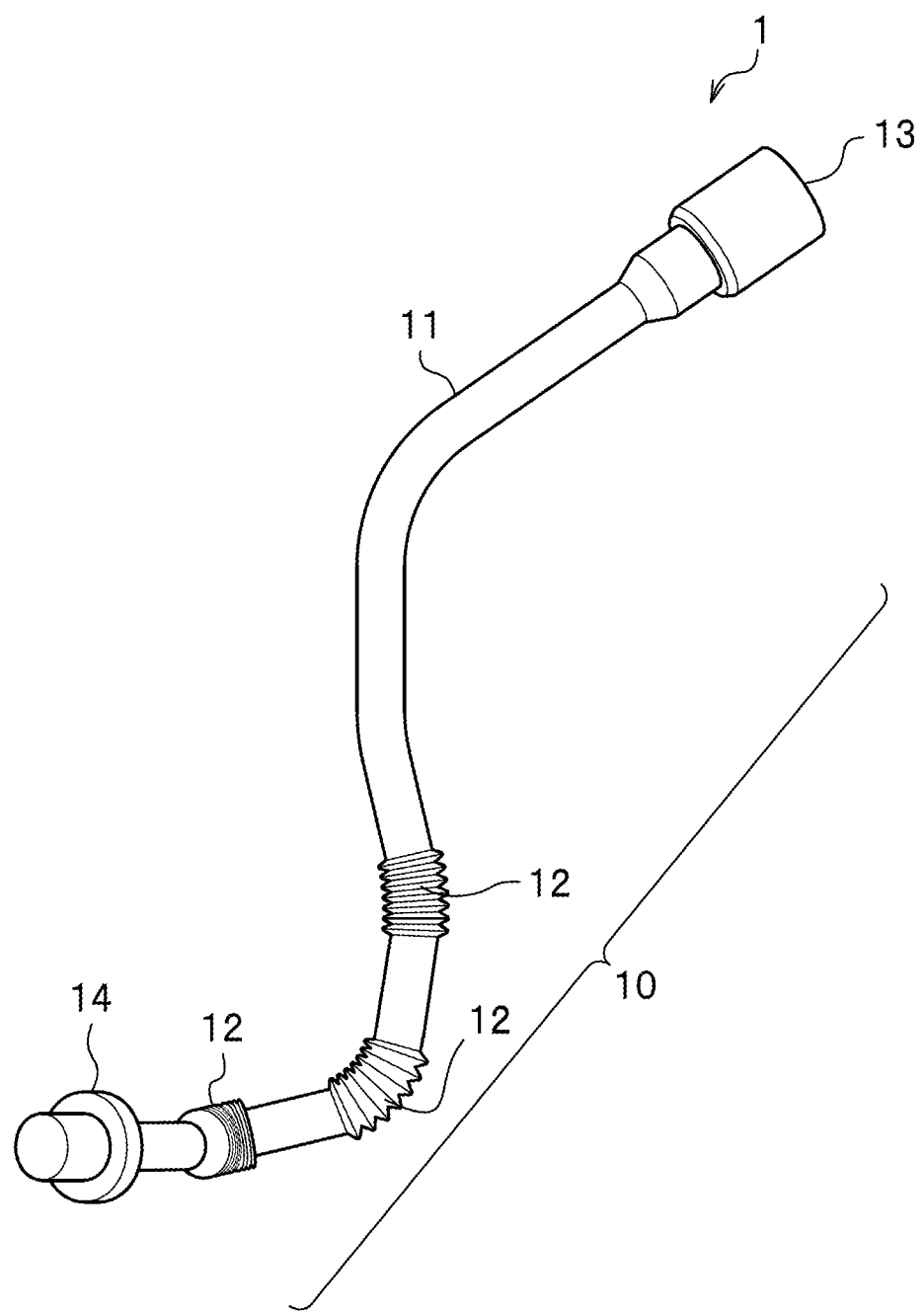
FIG. 1 is a schematic diagram of a filler pipe according to an embodiment of the present invention.

An embodiment of the present invention is described with reference to the drawings as appropriate. FIG. 1 illustrates a schematic diagram of a filler pipe 1 according to the embodiment of the present invention. The filler pipe 1 includes a center portion 10 as well as a fuel filler end portion 13 and a welding end portion 14 provided at both ends of the center portion respectively. The fuel filler end portion 13 is fitted to a fuel filler (not shown) of a vehicle, and the welding end portion 14 is welded to a periphery of an opening portion of a fuel tank (not shown). Supplying liquid fuel from a fuel nozzle inserted into the fuel filler allows the liquid fuel to flow through the filler pipe 1 and be stored in the fuel tank.

Figure 2:
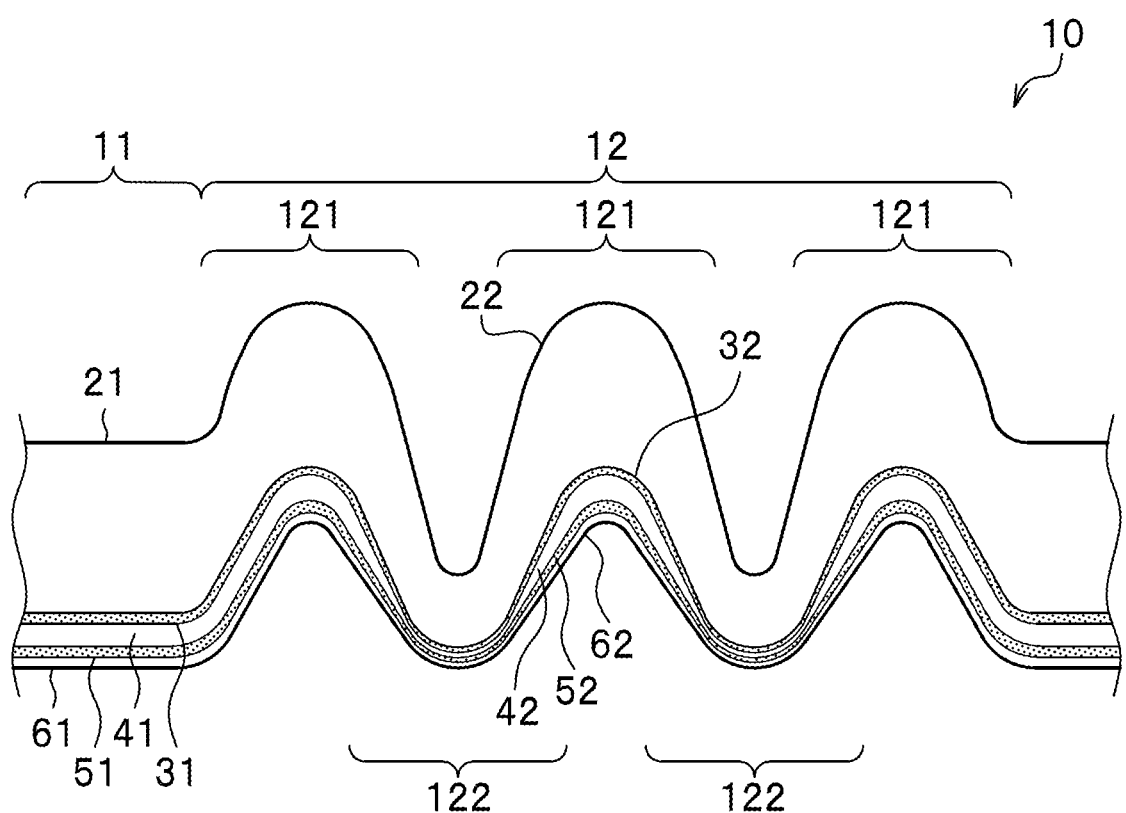
FIG. 2 is an enlarged diagram of the filler pipe according to the present embodiment.

The center portion 10 includes bellows sections 12 at three locations and an ordinary section 11 with no bellows sections 12, and is formed in a substantially cylindrical shape. As shown in FIG. 2, the bellows sections 12 are each a bellows-shaped section including peaks 121 and valleys 122, and can be bent. Note that the shape of the center portion 10 is designed as appropriate depending on the positions of the fuel tank and the fuel filler relative to each other, the distance between the fuel tank and the fuel filler, layouts of peripheral devices, and the like. Accordingly, the number of bellows sections 12 in the center portion 10 may be more or less than three, or the entire center portion 10 may have a bellows shape.

As shown in FIG. 2, the center portion 10 is formed by stacking layers of resins. In the present embodiment, the center portion 10 has, for example, a five-layer structure made of three types of resins. A layer configuration of the filler pipe 1 only needs to include at least an inner layer, a barrier layer, and an outer layer, and the material and thickness of each layer may be set as appropriate.

The ordinary section 11 is formed of an outer layer 21, an outer layer bonding layer 31, a barrier layer 41, an inner layer bonding layer 51, and an inner layer 61. The inner layer 61 is sufficiently thinner than the outer layer 21. In the ordinary section 11, assuming that the total thickness of the inner layer 61 and the outer layer 21 is 10, the proportion of the inner layer 61 is about 1, and the proportion of the outer layer 21 is about 9.

Each bellows section 12 includes multiple peaks 121 and multiple valleys 122 that are alternately arranged. The peaks 121 and the valleys 122 each include an outer layer 22, an outer layer bonding layer 32, a barrier layer 42, an inner layer bonding layer 52, and an inner layer 62. The inner layer 62 is sufficiently thinner than the outer layer 22. In each peak 121, assuming that the total thickness of the inner layer 62 and the outer layer 22 is 10, the proportion of the inner layer 62 is about 0.5, and the proportion of the outer layer 22 is about 9.5. Although each of the layers in the ordinary section 11 and a corresponding one of the layers in the bellows section 12 are denoted by different reference numerals for the convenience of description, these layers are integrally formed of the same materials.

The outer layers 21 and 22 are located outermost in the filler pipe 1, and form an outer wall surface of the filler pipe 1. The material of the outer layers 21 and 22 is not limited to a particular material as long as the material has stiffness necessary for protecting the filler pipe 1 from deformation and impact resistance, weather resistance, chemical resistance, and the like necessary for protecting the layers inside the outer layer bonding layers 31 and 32, and is preferably, for example, a material containing polyethylene that is a thermoplastic resin, more preferably a material containing high-density polyethylene.

The outer layer bonding layers 31 and 32 are layers that bond the outer layers 21 and 22 and the barrier layers 41 and 42 to one another. The inner layer bonding layers 51 and 52 are layers that bond the barrier layers 41 and 42 and the inner layers 61 and 62 to one another. The material of the outer layer bonding layers 31 and 32 and the inner layer bonding layers 51 and 52 is not limited to a particular material as long as the material exhibits bonding properties between the layers. When the outer layers 21 and 22 and the inner layers 61 and 62 are made of polyethylene and the barrier layers 41 and 42 are made of EVOH, the material of the outer layer bonding layers 31 and 32 and the inner layer bonding layers 51 and 52 preferably contains, for example, modified polyethylene. Note that, when a material with bonding properties is used for one or both of a set of the outer layers 21 and 22 and the inner layers 61 and 62 and a set of the barrier layers 41 and 42, the outer layer bonding layers 31 and 32 and the inner layer bonding layers 51 and 52 may be omitted.

The barrier layers 41 and 42 are layers that suppress a case where a fuel gas generated from the liquid fuel passing through the filler pipe 1 permeates a wall surface of the filler pipe 1 and leaks to the outside. The material of the barrier layers 41 and 42 is not limited to a particular material as long as the material has gas barrier properties for the fuel gas, and is preferably, for example, a material containing EVOH.

The inner layers 61 and 62 are located innermost in the filler pipe 1, and form an inner wall surface of the filler pipe 1. The material of the inner layers 61 and 62 is not limited to a particular material as long as the material has chemical resistance capable of protecting the barrier layers 41 and 42 from chemicals such as ethanol contained in the liquid fuel, and is preferably, for example, a material containing polyethylene that is a thermoplastic resin, more preferably a material containing high-density polyethylene.

Figure 3:
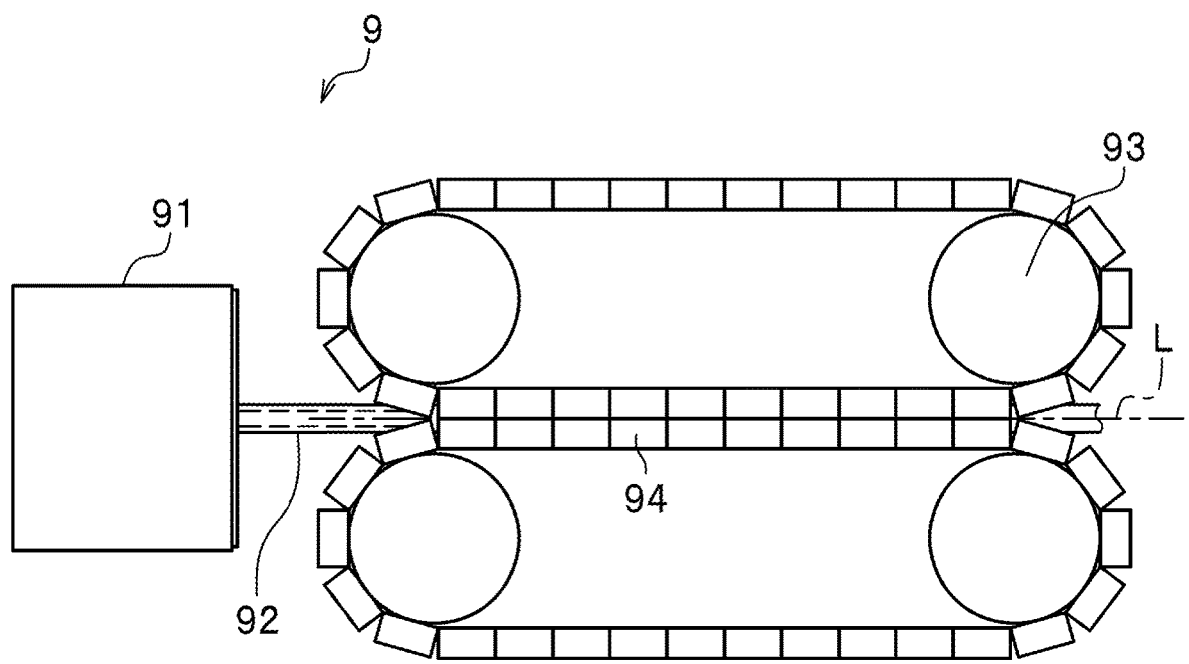
FIG. 3 is a schematic diagram of a pipe manufacturing apparatus that manufactures the filler pipe according to the present embodiment.

Next, a method of manufacturing the filler pipe according to the present embodiment is described. In the method of manufacturing the filler pipe according to the present embodiment, a pipe manufacturing apparatus 9 shown in FIG. 3 is used. The pipe manufacturing apparatus 9 can continuously form the filler pipe 1, and includes a so-called corrugating mechanism that forms varying cross sectional shapes in the ordinary section 11 and the bellows sections 12.

The pipe manufacturing apparatus 9 includes an extrusion unit 91 that extrudes a tubular material, multiple split forming molds 94 that shape an outer peripheral portion of the tubular material extruded from the extrusion unit 91, and a conveyance device 93 that conveys the split forming molds 94 in a loop shape. The extrusion unit 91 includes an extrusion device (not shown) for concentrically extruding the tubular material formed of multiple layers of resins, and the extrusion device is formed of a screw, a cylinder, a die, and the like.

Each of the split forming molds 94 includes a forming surface following the shapes of the ordinary section 11 and the bellows sections 12 in the filler pipe 1, and is arranged to pass through a conveyance path 92 in which the tubular material is conveyed. The split forming molds 94 are formed of split molds split along the center axis L of the conveyed tubular material. The split molds each have a loop shape, and is arranged to be mold-closed. Suction passages connected to a suction pump (not shown) are opened at positions corresponding to the peaks 121 of the bellows sections 12, in the forming surfaces of the split forming molds 94.

In the manufacturing of the filler pipe according to the present embodiment, an extrusion step and a forming step are performed. The extrusion step is a step of extruding the tubular material including at least the inner layer, the barrier layer, and the outer layer. In the present embodiment, the tubular material formed of the outer layer 21 (22), the outer layer bonding layer 31 (32), the barrier layer 41 (42), the inner layer bonding layer 51 (52), and the inner layer 61 (62) is extruded from the extrusion unit 91 to the conveyance path 92. In the extrusion step, the thickness of the inner layer of the tubular material is set to be smaller than the thickness of the outer layer. Note that the thicknesses of the respective layers in the ordinary section 11 are substantially the same as the thicknesses of the respective layers in the tubular material in the extrusion step.

The forming step is a step of forming the ordinary section 11 and the bellows sections 12 by transferring part of the tubular material to the forming surfaces of the multiple split forming molds 94 while moving the multiple split forming molds 94. Moreover, in the forming step, the outer layer 22 in portions corresponding to the peaks 121 of the bellows sections 12 is sucked to transfer the tubular material to the split forming molds 94. Furthermore, in the forming step, setting is made such that an increase rate of the inner layer proportion in the peaks 121 with respect to the inner layer proportion in the ordinary section 11 after the forming is equal to or smaller than an increase rate of the outer layer proportion in the peaks 121 with respect to the outer layer proportion in the ordinary section 11. The setting of these layer proportions can be appropriately set based on, for example, the viscosity of the tubular material, an extrusion rate, suction force in vacuuming of the tubular material, and the like. Note that, in this example, the case where the increase rate is smaller than 1 means that the inner layer proportion or the outer layer proportion has decreased.

After the aforementioned steps are performed, the tubular material is cut at a predetermined position. Then, portions where the bellows sections 12 are shaped are preheated to a softening point (80 to 90° C.) of the thermoplastic resin, and are subjected to a bending process to obtain the filler pipe 1 in which the bellows sections 12 are formed as the bent sections.

In this case, according to the conventional technique, as shown in, for example, FIG. 5 of Patent Literature 1 described above, the inner layer in the peaks of the bellows section is larger (thicker) than the inner layer in the ordinary section. In other words, the increase rate of the inner layer proportion in the peaks of the bellows section with respect to the inner layer proportion in the ordinary section after the forming is larger than the increase rate of the outer layer proportion in the peaks of the bellows section with respect to the outer layer proportion in the ordinary section. Particularly, in the inner layer in the peaks of the bellows section, the material tends to gather due to the suction and the inner layer tends to become relatively thick. When the inner layer in the peaks of the bellows section becomes thick, there occurs a problem that the inner layer in the peaks comes into contact with the fuel and swelling deformation is more likely to occur.

Meanwhile, in the filler pipe 1 according to the present embodiment, the increase rate of the inner layer proportion in the peaks 121 of the bellows sections 12 with respect to the inner layer proportion in the ordinary section 11 is equal to or less than the increase rate of the outer layer proportion in the peaks 121 of the bellows sections 12 with respect to the outer layer proportion in the ordinary section 11. Specifically, the increase rate on the inner layer side is (0.5 in peaks in bellows sections to 1.0 in ordinary section) while the increase rate on the outer layer side is 1.05 (9.5 in peaks in bellows sections to 9.0 in ordinary section). The inner layer 62 in the peaks 121 of the bellows sections 12 is thereby thinner than the inner layer 61 in the ordinary section 11, and the swelling deformation can be thus suppressed.

Moreover, in the forming step in the present embodiment, setting various conditions such that the increase rate of the inner layer proportion in the peaks 121 of the bellows sections 12 with respect to the inner layer proportion in the ordinary section 11 after the forming is equal to or less than the increase rate of the outer layer proportion in the peaks 121 of the bellows sections 12 with respect to the outer layer proportion in the ordinary section 11 can make the inner layer 62 in the peaks 121 of the bellows sections 12 thinner than the inner layer 61 in the ordinary section 11. This can suppress the swelling deformation.

Figure 4:
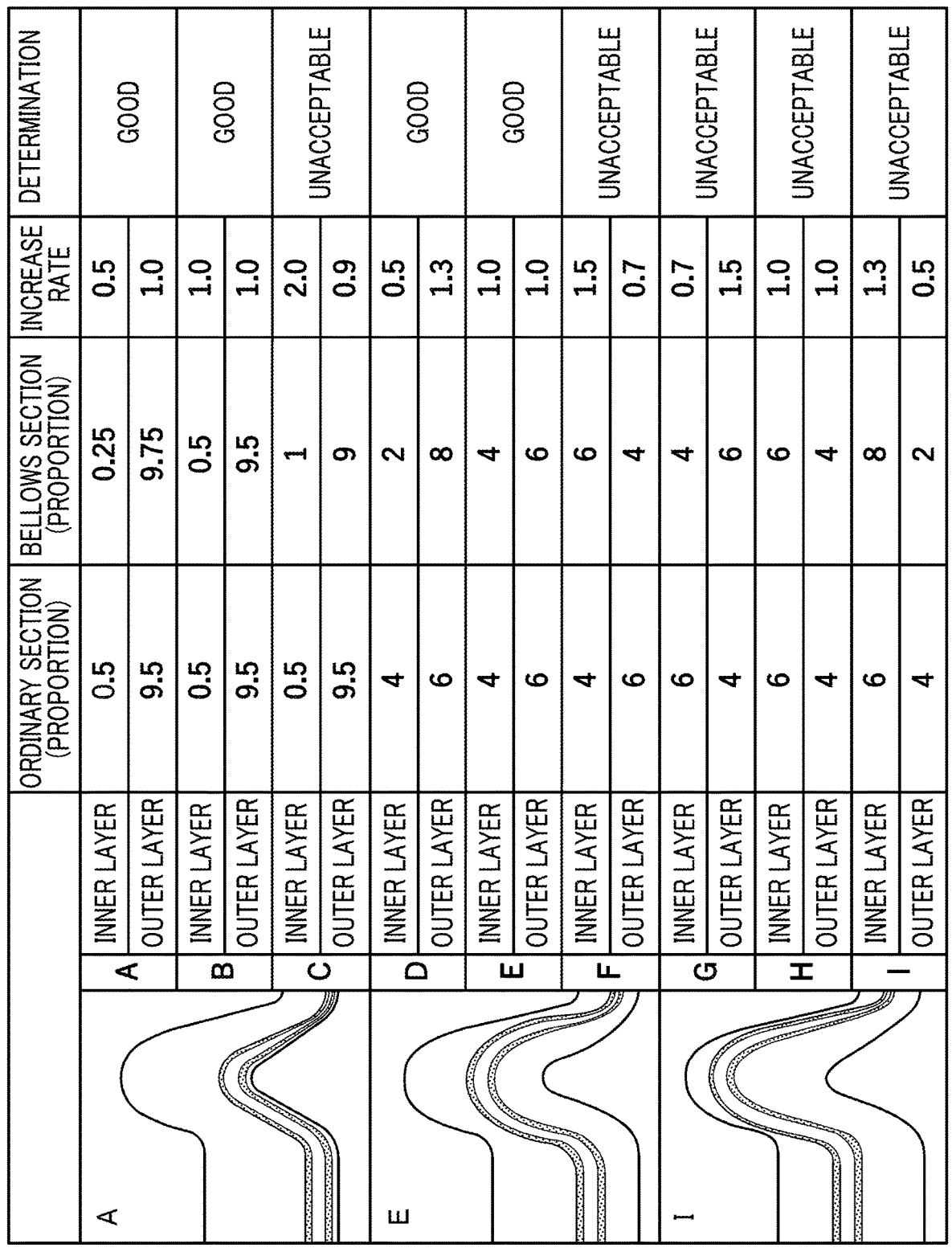
FIG. 4 is a table showing increase rates of the thicknesses of an ordinary section and bellows sections in filler pipes according to the present embodiment and comparative examples.

FIG. 4 is a table showing the increase rates of the thicknesses in the ordinary section and the bellows sections in filler pipes according to the present embodiment and comparative examples. In FIG. 4, patterns other than that in the aforementioned embodiment are discussed. In this section, description is given by using samples A to I as examples. An upper left view in FIG. 4 shows an enlarged view of the sample A, a middle left view shows an enlarged view of the sample E, and a lower left view shows an enlarged view of the sample I.

The samples A, B, and C are each a filler pipe in which, assuming that the total thickness of the inner layer and the outer layer in the ordinary section is 10, the inner layer proportion is 0.5 and the outer layer proportion is 9.5. In the sample A, the increase rate of the inner layer is smaller than the increase rate of the outer layer as in the aforementioned embodiment. Specifically, in the inner layer of the sample A, the inner layer proportion in the ordinary section is 0.5 while the outer layer proportion in the peaks of the bellows sections is 0.25, and the increase rate is 0.5. In the outer layer of the sample A, the outer layer proportion in the ordinary section is 9.5 while the outer layer proportion in the peaks of the bellows sections is 9.75, and the increase rate is 1.0 (1.02). Accordingly, the sample A is determined as good. In the sample B, the increase rate of the inner layer and the increase rate of the outer layer are the same. Accordingly, the sample B is also determined to be good.

Meanwhile, in the sample C, the increase rate of the inner layer is 2.0 while the increase rate of the outer layer is 0.9, and the increase rate of the inner layer is larger. In the sample C, the swelling deformation is more likely to occur in the inner layer in the peaks of the bellows sections, and the sample C is thus determined as unacceptable.

The samples D, E, and F are each a filler pipe in which, assuming that the total thickness of the inner layer and the outer layer in the ordinary section is 10, the inner layer proportion is 4 and the outer layer proportion is 6. The samples D and E have layer configurations similar to those of the samples A and B, and are determined to be good. Meanwhile, in the sample F, the increase rate of the inner layer is larger than the increase rate of the outer layer as in the sample C, and the sample F is thus determined as unacceptable.

The samples G, H, and I are each a filler pipe in which, assuming that the total thickness of the inner layer and the outer layer in the ordinary section is 10, the inner layer proportion is 6 and the outer layer proportion is 4. In the sample G, the increase rate of the outer layer is smaller than the increase rate of the inner layer. However, the thickness of the inner layer is originally larger than the thickness of the outer layer in the ordinary section, and the swelling deformation is likely to occur in the ordinary section. Accordingly, the sample G is determined as unacceptable. The samples H and I are also determined as unacceptable due to the same reason. Specifically, the inner layer is set to be thinner than the outer layer in the ordinary section (extrusion step).

FIG. 5 is a graph illustrating relationships between the ordinary section inner layer proportion and the peak inner layer proportion (inner layer proportion in the bellows sections of the peaks) in multiple filler pipes. A solid line shows a reference line where the proportion of the inner layer in the ordinary section and the proportion of the inner layer in the peaks of the bellows sections are the same, and a broken line show an approximate curve of experiment data.

As shown in FIG. 5, in the same forming conditions, the larger the inner layer proportion in the ordinary section, that is the tubular material is, the more likely the inner layer proportion in the peaks of the bellows sections will increase. For example, when the ordinary section inner layer proportion is 40%, the peak inner layer proportion in the bellows sections is about 52%. Specifically, as can be found also from FIG. 5, the peak inner layer proportion in the bellows sections tends to be larger than the ordinary section inner layer proportion in thickness. In the present invention, the setting is made such that the relationship between the ordinary section inner layer proportion and the peak inner layer proportion in the bellows sections is below the solid line of FIG. 5. According to the tendency of FIG. 5, the ordinary section inner layer proportion (proportion of the inner layer in the extrusion step) is preferably set small. Specifically, the inner layer proportion in the ordinary section is set smaller than the outer layer proportion, and is preferably set to 35.0% or less, more preferably 20.0% or less, even more preferably 10.0% or less. Setting the ordinary section inner layer proportion as described above allows the increase rate of the inner layer in the peaks of the bellows sections in the forming step to be set to an increase rate equal to or below the increase rate of the outer layer.

Note that the present invention is not limited to the aforementioned embodiment, and changes can be made within a scope not departing from the gist of the present invention.

REFERENCE SIGNS LIST 1 filler pipe
10 center portion
11 ordinary section
12 bellows section
121 peak
122 valley
21, 22 outer layer
31, 32 outer layer bonding layer
41, 42 barrier layer
51, 52 inner layer bonding layer
61, 62 inner layer

The invention claimed is:

1. A filler pipe having a bellows section that includes a peak and a valley and an ordinary section that does not include the bellows section, the filler pipe made of resin and comprising at least:
   an inner layer;
   a barrier layer; and
   an outer layer, wherein
   in the ordinary section, the inner layer is thinner than the outer layer,
   the inner layer in the bellows section is thinner than the inner layer in the ordinary section, and
   an increase rate of an inner layer proportion in the peak of the bellows section with respect to an inner layer proportion in the ordinary section is equal to or less than an increase rate of an outer layer proportion in the peak of the bellows section with respect to an outer layer proportion in the ordinary section.

2. A filler pipe manufacturing method, comprising:
   an extrusion step of extruding a tubular material including at least an inner layer, a barrier layer, and an outer layer; and
   a forming step of forming a bellows section that includes a peak and a valley and an ordinary section that does not include the bellows section by transferring part of the tubular material to forming surfaces of a plurality of split forming molds while moving the plurality of split forming molds, wherein
   in the extrusion step, an inner layer of the tubular material is set to be thinner than the outer layer, and
   in the forming step, the outer layer of the bellows section is sucked to transfer the tubular material to the split forming molds, the inner layer in the bellows section is adapted to be thinner than the inner layer in the ordinary section and, setting is made such that an increase rate of an inner layer proportion in the peak of the bellows section with respect to an inner layer proportion in the ordinary section after the forming is equal to or less than an increase rate of an outer layer proportion in the peak of the bellows section with respect to an outer layer proportion in the ordinary section.

* * * * *